United States Patent
Plakosh

Patent Number: 5,946,459
Date of Patent: Aug. 31, 1999

[54] SYSTEM FOR CLEARING AN IMAGE DATA BUFFER IN A HIGH-SPEED DIGITAL PRINTING APPARATUS

[75] Inventor: David Plakosh, Rochester, N.Y.

[73] Assignee: Xerox Corporation, Stamford, Conn.

[21] Appl. No.: 08/939,814

[22] Filed: Sep. 29, 1997

[51] Int. Cl.[6] .............. G06K 15/00; H04N 1/00; H04N 1/41
[52] U.S. Cl. .............. 395/115; 395/114; 395/116; 358/426; 358/261.4; 358/404
[58] Field of Search ................... 358/444, 404, 358/403, 442, 261.4, 426, 427, 539, 296; 382/232, 233; 348/231; 395/115, 116, 114

[56] References Cited

U.S. PATENT DOCUMENTS

| | | | |
|---|---|---|---|
| 4,760,608 | 7/1988 | Shimizu et al. | 382/295 |
| 5,008,760 | 4/1991 | Shimizu et al. | 358/451 |
| 5,107,338 | 4/1992 | Saito | 358/296 |
| 5,864,407 | 1/1999 | Shimizu et al. | 358/453 |

*Primary Examiner*—Edward L. Coles
*Assistant Examiner*—Cheukfan Lee
*Attorney, Agent, or Firm*—R. Hutter

[57] ABSTRACT

A system for clearing a buffer for holding bitmap data output by a decomposer or interpreter in a digital printing apparatus exploits a decompressor chip. Instead of having the processor directly write blank data into the buffer to clear the buffer, a "buffer clear" software utility sends compressed blank image data to the decompressor chip, which in turn decompresses the blank image and writes the decompressed blank image to the necessary location in the buffer.

14 Claims, 1 Drawing Sheet

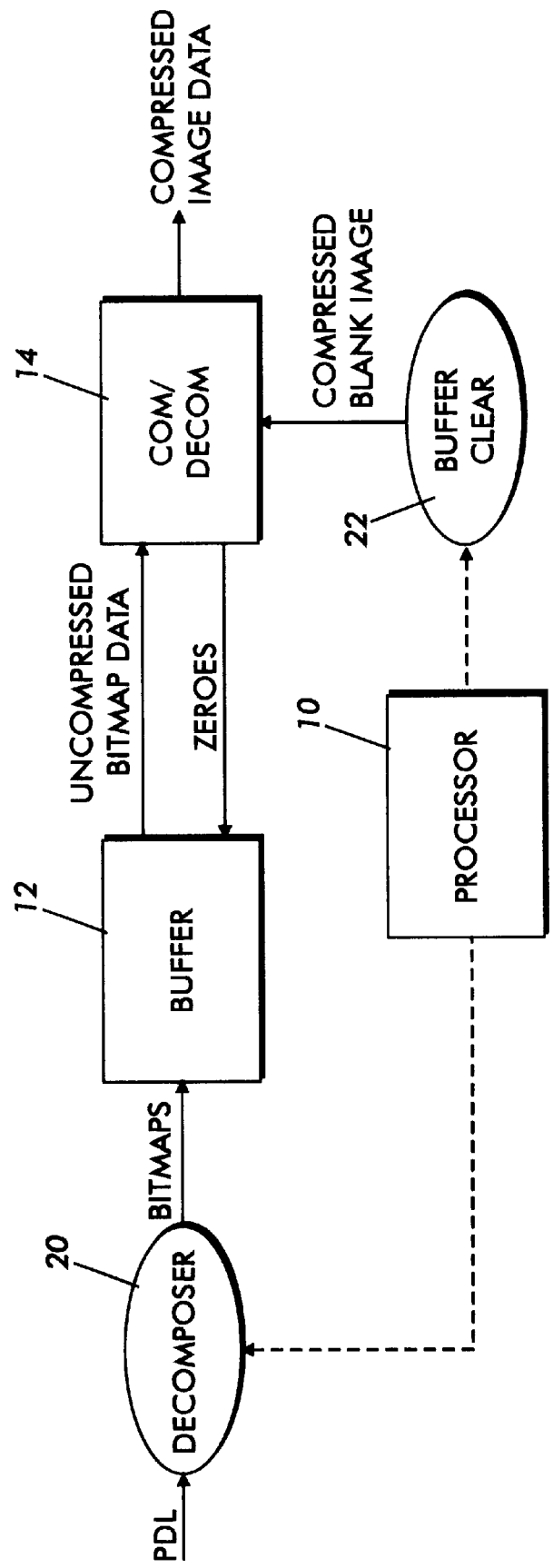

SYSTEM FOR CLEARING AN IMAGE DATA BUFFER IN A HIGH-SPEED DIGITAL PRINTING APPARATUS

FIELD OF THE INVENTION

The present invention is directed to digital printing systems, in which original image data in a page description language (PDL) or other format is converted into bitmaps which are directly operative of printing hardware, such as a laser or an ink-jet printhead.

BACKGROUND OF THE INVENTION

In the art of digital printing, such as with ink-jet printers or electrophotographic "laser" printers, the use of page description languages (PDL's) is well known. The PDL (or other format, such as a facsimile format) represents a system in which data representative of an image to be printed can be retained in a relatively small amount of memory. However, the printing hardware, such as an ink-jet printhead or modulating laser, requires "bitmap data," that is 1's and 0's, which are directly operative of the hardware to form the image. Most digital printing systems in current use include a software utility called a decomposer, also known as an interpreter, which performs the task of converting image data in a PDL or other format to the bitmap data directly useable by the hardware. Common types of PDL include PostScript™ and the various versions of PCL.

In any digital printing apparatus, the functions of the decomposer represent a "heavyweight" consumer of processor bandwidth. That is, whether the processor associated with the printing apparatus is a microprocessor or workstation such as a SPARC station, most of the activities of the processor in the printing process will be given over to the functions of the decomposer processing the PDL image data. Thus, in designing a digital printing system comprising hardware and software, it is generally desirable not to divert the processor from its essential task of operating the decomposer.

One software task which is often performed by the processor in a digital printing apparatus is "buffer clearing." In brief, once the decomposer, operated by the processor, outputs a quantity of bitmap data for use by the hardware, this bitmap data must be temporarily retained in a buffer until the precise time (such as when printing a particular page) that the hardware needs the data. Thus, large quantities of bitmap data must move in and out of the buffer in the course of printing a multi-page document, as the bitmap data for various pages are decomposed and then used to operate the hardware. However, once the page associated with the bitmap data has been printed and the bitmap data is no longer needed in the buffer, the space within the buffer that had been occupied by the bitmap data must be cleared, or erased, so that the space in memory can receive bitmap data for a subsequent image to be printed. Generally, if the space in the buffer were not cleared in this way, the bitmap of the subsequent image would simply be superimposed on the data of the previous image in the same space in the buffer, yielding nonsensical image data.

In general, the operation of buffer clearing simply involves the writing of a large series of zeroes (or other data consistent with a blank image) into the place in the buffer where a subsequent image is to be written. As mentioned above, this necessary step of "buffer clearing" can represent a consumer of processor bandwidth which competes with the activities of the processor in operating the decomposer. The present invention is directed to a system whereby this action of buffer clearing only minimally consumes processor bandwidth.

DESCRIPTION OF THE PRIOR ART

In the prior art, U.S. Pat. No. 5,107,338 discloses a digital printing apparatus in which image data retained in a buffer memory is applied to printing hardware. In many printing jobs, there will be a requirement that a number of blank pages be printed, and instead of having a blank page image take up space in the buffer memory, a separate "blank page data holding section" generates blank page data directly to the hardware at the appropriate time. It should be noted that this patent is directed to generating blank page data to be submitted to the printing apparatus, and not to clearing the buffer memory.

SUMMARY OF THE INVENTION

According to one aspect of the present invention, there is provided an apparatus for managing image data. A buffer retains image data. A decompression hardware utility is associated with the buffer, the decompression hardware utility being adapted to decompress compressed data submitted thereto, and write the decompressed data to the buffer. A buffer clear software utility causes the decompression hardware utility to write data consistent with a blank page image into at least a portion of the buffer.

According to another aspect of the present invention, there is provided an apparatus for managing image data comprising a processor, a decomposer operated by the processor, and a buffer for retaining image data output by the decomposer. A decompression hardware utility is associated with the buffer and operates independently of the processor. A buffer clear software utility, which is operated by the processor, causes submission of compressed data consistent with blank page image to the decompression hardware utility, thereby causing the decompression hardware utility to write data consistent with a blank page image into at least a portion of the buffer.

According to another aspect of the present invention, there provided a method of clearing a buffer for retaining image data. Compressed data consistent with a blank page image is submitted to a decompression hardware utility. The decompression hardware utility decompresses said compressed data and writes decompressed data consistent with a blank page image into at least a portion of the buffer.

BRIEF DESCRIPTION OF THE DRAWING

The FIGURE is a systems diagram illustrating the present invention.

DETAILED DESCRIPTION OF THE INVENTION

The FIGURE is a systems diagram showing the essential elements of the present invention, within the context of a digital printing apparatus. In the system shown, the basic input is original image data in a PDL format, although other formats, such as a facsimile format, could also be used, and the output is compressed bitmap data (i.e., original PDL data which has been decomposed into bitmap data, but subsequently compressed, such as with JPEG compression). In a typical context of a high-speed printing apparatus, the compressed bitmap data is subsequently temporarily stored until needed by printing hardware.

In the FIGURE, round blocks represent software utilities or tasks, that is, software routines which are carried out on hardware, while the rectangular blocks represent hardware, such as the processor 10, buffer 12, and a compressor/decompressor indicated as 14. The processor 10 operates the decomposer, which is a software utility indicated as 20, to decompose original PDL or other format image data and output bitmap data into a predetermined location in buffer 12, as is known in the art. Processor 10 could conceivably be a microprocessor, or a SPARC™ or UltraSPARC™ station, while buffer 12 is any of a variety of memory chips which are readily available. It is known in the art to provide dedicated chips having the dual function of compressing uncompressed data submitted thereto, and also decompressing compressed data submitted thereto; what is important, for showing the advantage of the present invention, is that such a compressor/decompressor such as 14 is typically available as an off-the-shelf dedicated chip. Typical kinds of commercially-available compressor/decompressor chips such as 14 include XACD (Xerox Adaptive compressor and decompressor), VCEP (which performs CCITT compression and decompression), and AHA. In the claims herein, a dedicated function performed by hardware, such the decompression function in a compressor/decompressor chip, is referred to as a "hardware utility." The decomposer 20 is a software utility, such as a commercial PostScript™ or PCL interpreter, which is ultimately operated by the CPU of the processor 10. Also operated by the CPU of processor 10 is a software utility shown as "buffer clear," indicated as 22, which is necessary for clearing out spaces in buffer 12 so that further bitmap data from decomposer 20 can be accepted. Because the processor 10 operates both the decomposer 20 and the buffer clear function 22, the buffer clear function 22 competes with the decomposer 20 for cycles of the processor 10; in other words, CPU cycles in processor 10 which are required for the buffer clear function 22 represent cycles which do not go to the decomposer 20. In the prior art, where a buffer clear function (such as the function known as MEMSET in the C language) directly writes a series of zeroes into the buffer 12, the buffer clear function represents a serious drain on CPU cycles.

With the present invention, however, the buffer clear function 22, although initiated by the processor 10, operates on hardware separate and independent from processor 10, namely compressor/decompressor 14. According to one embodiment of the present invention, when the processor 10 invokes the buffer clear function 22, buffer clear function 22 sets up the decompression hardware utility (within compressor/decompressor 14) to direct memory access ("DMA") a relatively small set of data representing a compressed version of a blank image. The decompressor hardware utility decompresses the blank image data and then DMA's the decompressed blank image data to the buffer 12. In other words, the compressor/decompressor 14 takes the compressed blank image submitted from buffer clear function 22, decompresses it into a page-sized field of zeroes or other data consistent with a blank image, and writes these zeroes into buffer 12 at the locations in buffer 12 which are desired to be cleared. The DMA technique of the preferred embodiment allows the processor 10 to start the operation, and then frees the processor to perform other functions such as decomposing. When the decompression is complete, the compressor/decompressor 14 interrupts the processor to notify the processor that the operation is complete.

For comparison with prior-art techniques, if one were simply to write a page-size field of zeroes into buffer 12, such a field would require 4 MB of memory to be loaded directly into buffer 12. However, a compressed version of this same field, compressed using well-known compression techniques, typically has a size of 1 byte per scanline, or approximately 5 KB. This relatively short 5 KB compressed blank field is what is DMA'd to the compressor/decompressor 14.

Another key advantage of the system of the present invention is that the burden of writing the blank image field (i.e., the zeroes) into the buffer 12 falls not on the CPU cycles of processor 10, but on the hardware functions of compressor/decompressor 14. Because compressor/decompressor 14 functions independently of processor 10, the writing of zeroes into buffer 12 does not represent a significant diversion of CPU cycles of processor 10. Because processor 10 does not have to be diverted to clearing the buffer 12, the processor 10 can devote a higher proportion of CPU cycles to the functions of decomposer 20, thus increasing the speed of decomposer 20.

As mentioned above, the compressor/decompressor 14 is typically available in the form of a dedicated hardware chip which provides both compression and decompression functions. As shown in the embodiment of FIG. 1, the "compression" portion of the compressor/decompressor 14 can be used to compress the image data read out of buffer 12 for temporary storage and ultimate submission to printing hardware. Thus, the design of FIG. 1 permits optimal use of the dedicated compressor/decompressor 14, as both the compressor and decompressor portions of the chip can be exploited.

In summary, the buffer clear software utility of the present invention, because it relies on the function of a decompressor separate from the processor, provides many practical advantages to a digital printing apparatus. First, because the buffer clear software utility operates a decompressor which is separate from the processor, there is less diversion of processor bandwidth from the functions of the decomposer, allowing the decomposer to operate more efficiently. Also, because the buffer clear software utility exploits an off-the-shelf chip which is already being used for compressing image data, the buffer clear software utility facilitates a less expensive board design for a digital printing apparatus.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. An apparatus for managing image data, comprising:
   a buffer for retaining image data;
   a decompression hardware utility associated with the buffer, the decompression hardware utility adapted to decompress compressed data submitted thereto and write the decompressed data to the buffer; and
   a buffer clear software utility, adapted to cause the decompression hardware utility to write data consistent with a blank page image into at least a portion of the buffer.

2. The apparatus of claim 1, the buffer clear software utility causing submission of compressed data consistent with a blank page image to the decompression hardware utility.

3. The apparatus of claim 1, further comprising a processor, the buffer clear software utility being operated by the processor, the decompression hardware utility operating independently of the processor.

4. The apparatus of claim 3, further comprising a decomposer associated with the buffer, the decomposer being operated by the processor.

5. The apparatus of claim 1, wherein the buffer clear software utility sets up a DMA of the compressed data to the decompression hardware utility.

6. The apparatus of claim 1, wherein the buffer clear software utility sets up a DMA of the compressed data from the decompression hardware utility to the buffer.

7. An apparatus for managing image data, comprising:

a processor;

a decomposer, operated by the processor;

a buffer for retaining image data output by the decomposer;

a decompression hardware utility associated with the buffer, the decompression hardware utility operating independently of the processor; and a buffer clear software utility, operated by the processor, the buffer clear software utility causing submission of compressed data consistent with a blank page image to the decompression hardware utility, thereby causing the decompression hardware utility to write data consistent with a blank page image into at least a portion of the buffer.

8. The apparatus of claim 7, wherein the buffer clear software utility sets up a DMA of the compressed data to the decompression hardware utility.

9. The apparatus of claim 7, wherein the buffer clear software utility sets up a DMA of the compressed data from the decompression hardware utility to the buffer.

10. A method of clearing a buffer for retaining image data, comprising the steps of:

submitting compressed data consistent with a blank page image to a decompression hardware utility; and the decompression hardware utility decompressing said compressed data and writing decompressed data consistent with a blank page image into at least a portion of the buffer.

11. The method of claim 10, wherein the submitting step includes setting up a DMA of the compressed data to the decompression hardware utility.

12. The method of claim 10, wherein the step of decompressing said compressed data includes setting up a DMA from the decompression hardware utility to the buffer.

13. The method of claim 10, further comprising the steps of:

providing a processor, the processor functioning independently of the decompression hardware utility; and the processor initiating the step of submitting compressed data consistent with a blank page image to the decompression hardware utility.

14. The method of claim 13, further comprising the step of the decompression hardware utility notifying the processor when the step of decompressing said compressed data is completed.

\* \* \* \* \*